United States Patent

Corson

[11] 3,854,558
[45] Dec. 17, 1974

[54] TACKLE BOX LATCH

[76] Inventor: Steve Corson, R.R. No. 1, Luther, Mich. 49656

[22] Filed: July 30, 1973

[21] Appl. No.: 383,502

[52] U.S. Cl. .............................................. 190/58 A
[51] Int. Cl. ........................................... A45c 13/10
[58] Field of Search .......................... 190/56, 58 A

[56] References Cited
UNITED STATES PATENTS

| 1,035,483 | 8/1912 | Scott | 190/58 A |
| 2,537,750 | 1/1951 | Gretschel | 190/58 A |

Primary Examiner—George E. Lowrance
Assistant Examiner—Ro E. Hart
Attorney, Agent, or Firm—Price, Heneveld, Huizenga & Cooper

[57] ABSTRACT

A safety latch and handle locking mechanism adapted to prevent spilling the contents of fishing tackle boxes or like containers. A special mounting for the handle on the cover of the box is shiftable between a handle-securing position and a handle-releasing position in response to the position of the latch holding the cover and base in closed position. When the latch is opened and the cover is not secured, the special mounting shifts to a handle-releasing position. Accordingly, if the handle is grasped to lift the box when the latch is open, the handle releases from the box thereby preventing the contents of the box from spilling.

6 Claims, 8 Drawing Figures

PATENTED DEC 17 1974 3,854,558
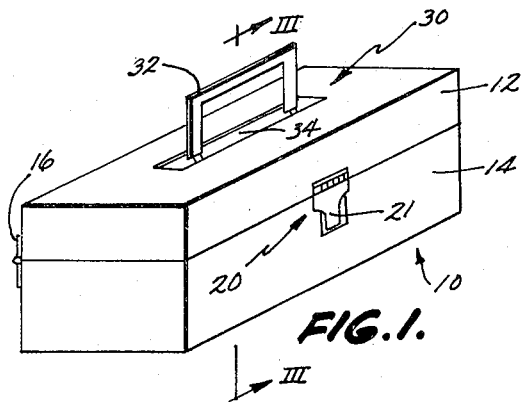
FIG.1.
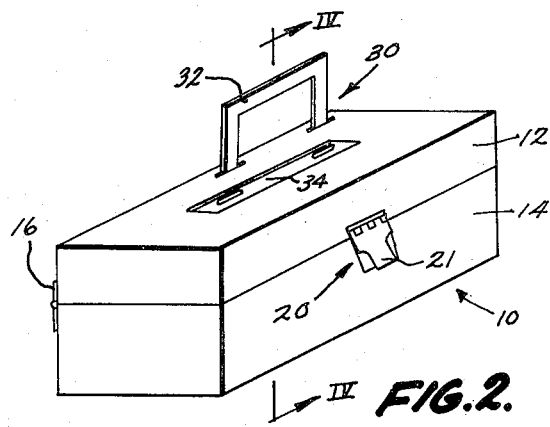
FIG.2.
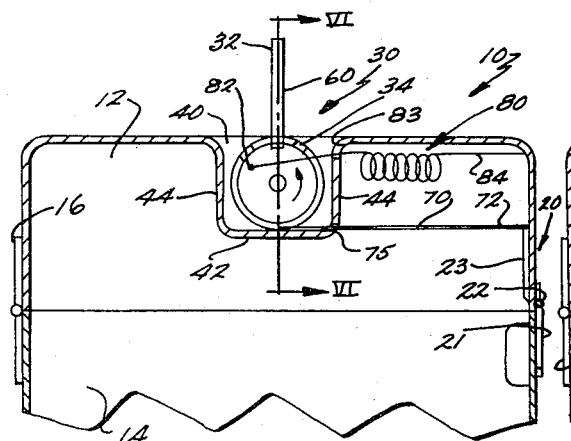
FIG.3.
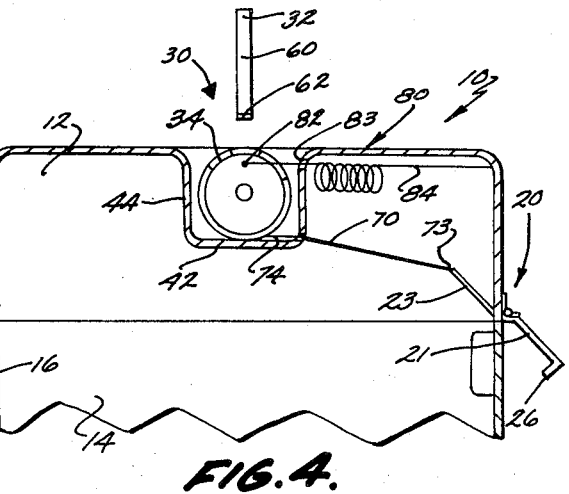
FIG.4.
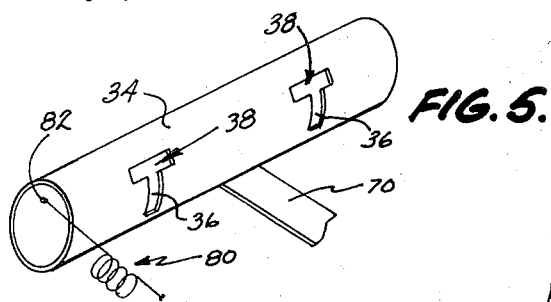
FIG.5.
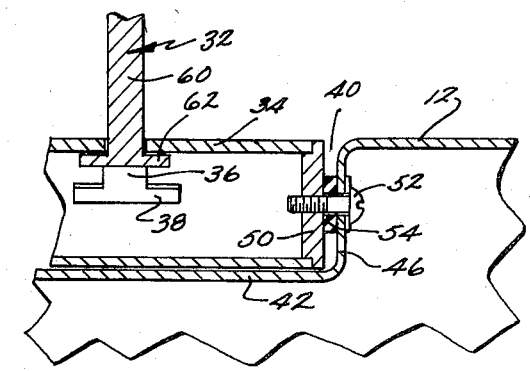
FIG.6.
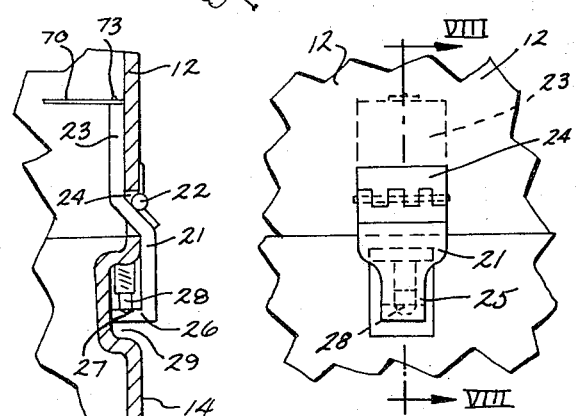
FIG.8.
FIG.7.

TACKLE BOX LATCH

BACKGROUND OF THE INVENTION

Fishing tackle boxes, tool boxes, and like containers are generally provided with a hinged top cover structure upon which a handle or the like is provided for transporting the box. Oftentimes, the latch securing the cover and base together is not properly fastened. When the handle is grasped to move the box, the cover and base separate causing the contents thereof to spill. The inventor herein, an ardent fisherman, has experienced this problem many times in his years of fishing and realizes the frustrations accompanying such spillage. While a mental note may be made at the time the box is opened to latch the box before moving it, frequently, the box must be moved quickly without thought being given to latching the cover. Spillage of the contents, of course, then results.

SUMMARY OF THE INVENTION

In view of the above problems, the present invention provides a special latch and releasable handle for a container as a fishing tackle box. This combination prevents such spillage and loss of the contents when the box is moved. The handle includes a special mounting associated with the latch assembly. The handle mounting is shiftable between handle-releasing and handle-securing positions in response to the position of the latch. When latched, the handle is secured to the top by the mount. When unlatched, the handle releases from the mount thereby preventing the box from being lifted and the accompanying spillage of the contents.

The many objects and advantages of the present invention will be readily appreciated by those skilled in the art as the invention becomes better understood by references to the following detailed specification and the accompanying drawings illustrating a preferred embodiment of the invention.

BRIEF DESCRIPTION OF THE DRAWINGS

FIG. 1 is a perspective view of a tackle box incorporating the invention with the top closed and the handle and mount in a handle-securing position;

FIG. 2 is a perspective view similar to FIG. 1 showing the latch opened and the handle and mount in a release position;

FIG. 3 is a partial cross-sectional view taken along the plane III—III of FIG. 1 illustrating the handle, the mount and the actuator means associated with the latch and mount in a handle-securing position;

FIG. 4 is a cross-sectional view similar to FIG. 3 taken along the plane IV—IV of FIG. 2 showing the mechanism in handle-release position;

FIG. 5 is a perspective view of the mounting mechanism of the invention;

FIG. 6 is a fragmentary, cross-sectional view illustrating the rotatable mounting mechanism with the handle secured therein;

FIG. 7 is a fragmentary plan view of the latch assembly; and

FIG. 8 is a cross-sectional view of the latch assembly of FIG. 7 as viewed along the plane VIII—VIII.

DESCRIPTION OF THE PREFERRED EMBODIMENT

Referring now to the drawings, a typical closed container as a fishing tackle box or tool box 10 is illustrated. The container includes a cover 12 and a base 14 connected together along one edge by a hinge 16 so that access may be had to the interior thereof. When closed, cover 12 is secured to the base 14 at the side of the box opposite hinge 16 by a latch assembly 20.

Latch assembly 20 includes two interengageable parts, pivotally mounted latch portion 21 and a spring loaded catch 28 (FIGS. 7 and 8). The latch 21 is mounted for pivotal movement on a hinge-like pin arrangement 22 such that latch 21 pivots with respect to cover 12. An upper arm 23 of the latch extends into the interior of the top through an opening 24 in the sidewall of the cover. A lower arm 25 of bail 21 extends outwardly of the interior of the box. The width of latch 21 tapers inwardly along lower arm 25 and terminates at an inwardly directed leg 26. Leg 26 includes an upwardly opened detent or recess 27 which is adapted for engagement with spring loaded catch pin 28. Catch pin 28 is mounted in a recess 29 formed in the upper portion of the sidewall of base 14. When the latch is closed, engagement of leg 26 with catch pin 28 holds the latch in closed position.

Handle assembly 30 includes a bail 32 which is releasably secured in a rotatable handle mounting element 34. Mounting element 34 as best illustrated in FIGS. 5 and 6, is an elongated tube having a pair of spaced-apart, T-shaped slots 36 formed along its periphery. The upper portion or top of the T 38 extends generally parallel to the axis of the tubular member. Mounting element 34 is mounted for rotation in a recess 40 formed in cover 12. The recess includes a bottom wall 42, side walls 44 (FIGS. 3 and 4) and end walls 46 (FIG. 6). Tubular mounting element 34 is closed at its ends by plugs 50 and is mounted for rotation in recess 40 by screws 52 passing through end walls 46 and into plug 50. Spacer washers 54 made of lubrilous material positioned between the end walls 48 and plug 50 allow free rotation of mounting element 34 in recess 40.

The handle or bail 32 is generally U shaped with the legs 60 of the U being spaced apart a distance equal to the spacing between slots 36 in mounting element 34. The ends of the legs 60 are provided with an outwardly extending flange 62 to form a generally T-shaped leg. The thickness of the handle is slightly smaller than slot 36 and the size of the T-shaped flange 62 is slightly smaller than the T slot part 38 in the mounting element. Accordingly, the handle is positionable in mounting element 34 by passing the flanged ends 62 through the elongated slot 38 of mounting element 34 and into slot 36. The handle fits into the mounting element with a very slight pressure to insure that it will not accidently fall out when the box is opened. When the element is rotated in a manner to be discussed hereinafter, flange 62 abuts the inner surface of the mounting element adjacent the slot 36 (FIG. 6) and cannot be removed. When the element is rotated in the opposite direction, flanges 62 freely pass through slot 38.

The operating relationship of mounting 34 with latch assembly 20 is best illustrated with reference to FIGS. 3 and 4. Upper arm 23 of bail 21 is connected to mounting element 34 by means of a linking arm 70. Preferably, linking arm 70 is a strap of rigid plastic-like material. End 72 of the linking arm is connected by means of a pin 73 to upper arm 22 of the latch. The opposite end 74 is wrapped partially around mounting element 34 and is secured thereto as by a high strength adhesive. Linking arm 70 passes through a slot 75 in a lower portion of sidewall 44.

Bias spring 80 is provided to rotate mounting element 34 to a handle release position as shown in FIG. 4 when latch assembly 20 is not closed. End 82 of bias spring 80 passes through an opening 83 in sidewall 44 where it is secured to the end mounting element 34 at a peripheral edge of plug 50. The opposite end 84 of bias spring 80 is fastened to the interior of top 12 in any common manner. The tension of spring 84 is selected such that when the latch is closed as illustrated in FIG. 3, the force is not sufficient to overcome the engagement of leg 26 with catch pin 28 (FIG. 8).

When closed, upper arm 23 of latch 21 is pivoted about hinge pin 22 toward the side of the top at the interior thereby drawing on linking arm 70 causing mounting element 34 to rotate in a counter-clockwise direction. When rotated the leg 36 of the T-shaped slots engage T-shaped flanges 62 on legs 60 of handle 30 to thereby secure the handle position as illustrated in FIG. 6.

When the latch is released as illustrated in FIG. 4 tension bias spring 80 rotates mounting element 34 such that the top 38 of the T-shaped slots are positioned upwardly allowing flanges 62 to pass through and the handle is released therefrom. The extent of rotation of mounting element 34 by bias spring 80 is controlled by the combined length of linking arm 70 and arm 23 of the latch assembly so that when released the T-slots 38 are positioned in an upward direction to thereby release the handle.

Those skilled in the art will immediately recognize that the present invention in its unique provision of a releasable handle assembly eliminates the possibility of spilling the contents of a container. The novel latch actuated releasable handle assembly is of relatively simple construction and yet is extremely effective in use.

Although a preferred embodiment of the invention has been described and illustrated, various modifications can be made without departing from the spirit of the invention. Accordingly, the scope of the present invention is deemed to be limited only by the appended claims.

The embodiments of the invention in which an exclusive property or privilege is claimed are defined as follows:

1. In a container having a base, a cover hingedly mounted to said base for closing same, a handle associated with said cover for carrying the container, and latching means shiftable between locked and unlocked positions for maintaining said cover and base in closed relationship when in locked position, the improvement comprising:
   means for mounting said handle to said cover, said mounting means being shiftable between a handle-securing position and a handle-release position; and
   actuator means for shifting said mounting means between said positions, said actuator means operatively connecting said latching means and said mounting means, said actuator means shifting said mounting means to said handle-securing position when said latch is in locked position, and to said handle release when in unlocked position.

2. The construction as defined in claim 1 wherein said mounting means comprises a first element shiftably mounted on said cover, said element being shiftable between said positions; and cooperable engaging means on said element and said handle, said engaging means securing said handle and element in said securing position and releasing said handle from said element in said release position.

3. The combination as defined in claim 2 wherein said cooperable engaging means includes said element having an elongated first slot formed therein and a second slot formed therein intermediate said first slot extending perpendicular thereto; said handle having a portion thereon of a size passable through said second slot and impassable through said first slot whereby when said element is shifted to said release position, said portion and said second slot are in alignment and said handle is removable from said element.

4. The combination of claim 3 and further including biasing means for said element, said biasing means normally biasing said element into said handle-release position.

5. The combination of claim 4 wherein said actuator means operates in response to movement of said latch means, said actuator means operating in opposition to said biasing means when said latching means is in said locked position to thereby shift said element to said handle securing position.

6. The combination of claim 5 wherein said cover is formed with an elongated recess therein, said element comprising an elongated tubular member mounted for rotation in said recess and wherein said handle extends upwardly from said element.

* * * * *